United States Patent
Albanese et al.

(10) Patent No.: US 10,726,225 B2
(45) Date of Patent: Jul. 28, 2020

(54) PROXY AIMING FOR CONTACT READING

(71) Applicant: Datalogic IP Tech S.R.L., Calderara di Reno (IT)

(72) Inventors: Fabio Albanese, Castel Maggiore (IT); Michele Suman, Ponte San Nicolo (IT)

(73) Assignee: Datalogic IP Tech S.R.L., Calderara di Reno, Bologna (IT)

(*) Notice: Subject to any disclaimer, the term of this patent is extended or adjusted under 35 U.S.C. 154(b) by 0 days.

(21) Appl. No.: 16/050,831

(22) Filed: Jul. 31, 2018

(65) Prior Publication Data
US 2020/0042756 A1 Feb. 6, 2020

(51) Int. Cl.
*G06K 7/10* (2006.01)

(52) U.S. Cl.
CPC ..... *G06K 7/10732* (2013.01); *G06K 7/10386* (2013.01); *G06K 7/10831* (2013.01)

(58) Field of Classification Search
CPC ............. G06K 7/1404; G06K 7/10881; G06K 2207/1011
USPC ...... 235/454, 462.15, 462.2, 462.22, 462.23, 235/462.25
See application file for complete search history.

(56) References Cited

U.S. PATENT DOCUMENTS

| | | | | |
|---|---|---|---|---|
| 6,340,114 B1* | 1/2002 | Correa | ............... | G06K 7/10722 235/462.01 |
| 6,843,417 B1* | 1/2005 | Philyaw | ............. | G06K 7/10861 235/462.01 |
| 7,201,321 B2 | 4/2007 | He et al. | | |
| 7,823,789 B2 | 11/2010 | Nunnink | | |
| 8,061,616 B2 | 11/2011 | Goren et al. | | |
| 2002/0148900 A1* | 10/2002 | Gurevich | ............. | G02B 26/106 235/462.34 |
| 2006/0043187 A1* | 3/2006 | He | ..................... | G06K 7/10722 235/462.2 |
| 2010/0155485 A1* | 6/2010 | Tan | .................... | G06K 7/10702 235/462.42 |

* cited by examiner

*Primary Examiner* — Daniel St Cyr
(74) *Attorney, Agent, or Firm* — Foley & Lardner LLP (57) ABSTRACT

A code reader and process may include an optoelectronic reading device configured to read a machine-readable indicia. A primary aiming illuminator may be configured to generate a first light beam to illuminate a first aiming pattern (i) onto a surface on which the machine-readable indicia is positioned and (ii) within a field-of-view of the optoelectronic reading device. A secondary aiming illuminator may be configured to generate a second light beam to illuminate a second aiming pattern (i) onto the surface on which the machine-readable indicia is positioned and (ii) outside or in a marginal region of the field-of-view of said optoelectronic reading device.

19 Claims, 10 Drawing Sheets

PROXY AIMING FOR CONTACT READING

BACKGROUND

Code readers are used in a wide variety of applications by reading machine-readable indicia, such as barcodes and direct part marking (DPM) codes. One use of hand-held code readers is for reading direct part marking codes on parts, such as vehicular parts, as understood in the art. Typically, in DPM applications where the DPM codes are small, reading at contact or near contact distances by a code reader is generally necessary to achieve a desired decoding performance in order to have the best light condition.

Many code readers include illumination devices that produce illumination or light aiming patterns, such as a cross or circle that is illuminated onto the DPM codes, to assist an operator when reading the DPM codes. However, in the cases where a DPM code is very small and the operator is reading the DMP code with a code reader at contact distances, the operator cannot see the standard aiming pattern because the aiming pattern is typically in the middle of the optical field-of-view (FOV) of the code reader. In other words, the code reader housing blocks the perspective field-of-view of the operator due to the code reader covering the optical field-of-view of the code reader, especially during the final part of the reading process when the scanner approaches the DPM code target at the contact distance. As understood, despite the DPM code being much smaller than the optical FOV of the code reader, it can be difficult for the user to properly align the DPM code within the optical FOV without the aid of the aiming pattern.

SUMMARY

To improve the ability for a user of a code reader to read direct part marking (DPM) codes that are typically read at a contact distance, a hand-held code reader may include a secondary aiming illumination system specifically designed for proximity or contact distance readings. The secondary aiming illumination system may be composed by one or more modules, where each module projects a light segment in close proximity to a side of a scanning window of the code reader, but outside or in a marginal portion of the optical field-of-view of the code reader. The secondary aiming illumination system is in addition to a conventional primary aiming system that projects an aiming pattern in the field-of-view of the reader. By including a secondary aiming system, when the imaged code is spaced apart from the reader, the user can see the primary aiming pattern to perform optimal targeting, and when the imaged code is in close proximity to the reader and the primary aiming pattern is blocked by the code reader, the secondary aiming illumination system may produce a secondary aiming pattern outside of the field-of-view of the code reader such that the user can use the secondary aiming pattern to perform optimal targeting of the machine-readable indicia.

One embodiment of a code reader may include an optoelectronic reading device configured to read a machine-readable indicia. A primary aiming illuminator may be configured to generate a first light beam to illuminate a first aiming pattern (i) onto a surface on which the machine-readable indicia is positioned and (ii) within a field-of-view of the optoelectronic reading device. A secondary aiming illuminator may be configured to generate a second light beam to illuminate a second aiming pattern (i) onto the surface on which the machine-readable indicia is positioned and (ii) outside or in a marginal region of the field-of-view of said optoelectronic reading device.

One embodiment of a method of reading a machine-readable indicia by a code reader may include initiating to read a machine-readable indicia. A first light beam may be generated to illuminate a first aiming pattern (i) onto a surface on which the machine-readable indicia is positioned and (ii) within a field-of-view of the code reader. A second light beam may be generated to illuminate a second aiming pattern (i) onto the surface on which the machine-readable indicia is positioned and (ii) outside or in a marginal region of the field-of-view of the code reader.

An embodiment of a code reader may include a housing configured to house optoelectronics to read machine-readable indicia. The optoelectronics may have an optical field-of-view and the housing defines a perspective field-of-view of a user of the code reader when in operation. The perspective field-of-view may block the entire optical field-of-view when in use. The code reader may further include a primary aiming illuminator. At least one secondary aiming illuminator may be supported by the housing, and may be configured to generate a light beam that projects at least partially outside of the optical and perspective fields-of-view such that a user of the operating the code reader can view the light beam when in use.

A code reader may include a housing configured to house optoelectronics to read machine-readable indicia. The optoelectronics may have an optical field-of-view and the housing may define a perspective field-of-view of a user of the code reader when in operation. The perspective field-of-view may block the entire optical field-of-view when in use. An aiming illuminator may be configured to illuminate an aiming pattern that extends outside of the optical field-of-view and into the perspective field-of-view such that a user operating the code reader at a contact distance can view the aiming pattern.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
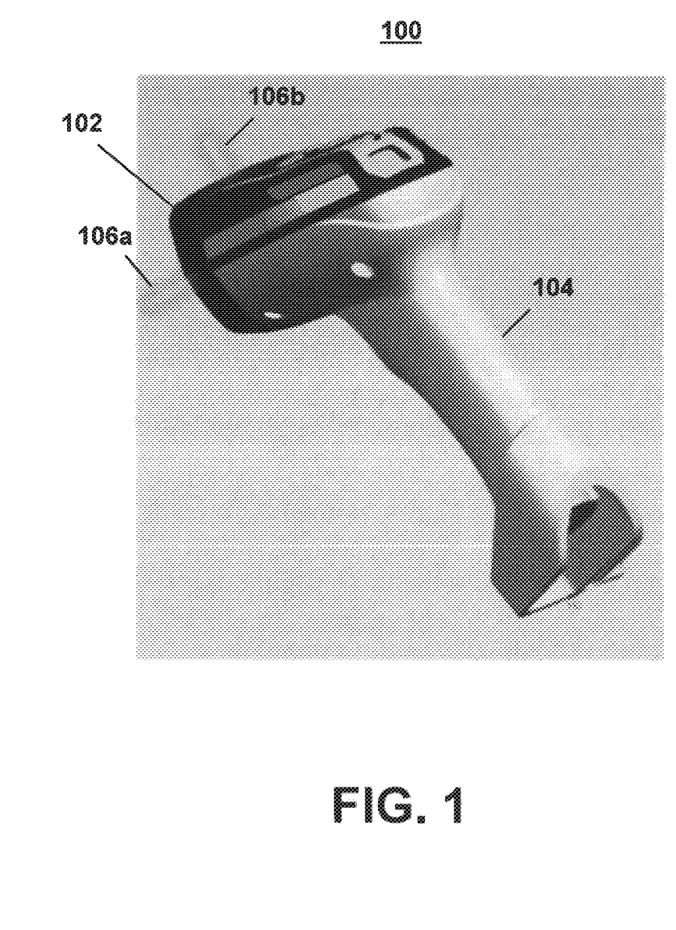
FIG. 1 is an illustration of an illustrative hand-held code reader for reading machine-readable indicia, and capable of generating a secondary aiming pattern to assist a user in aiming the code reader at the machine-readable indicia at contact distances.

With regard to FIG. 1, an illustration of an illustrative hand-held code reader 100 that reads machine-readable indicia (e.g., DPM code, barcode, QR code, etc.), and capable of generating primary and secondary aiming patterns to enable a user to view an aiming pattern when reading the machine readable indicia at non-contact and contact distances is shown. The code reader 100 may include a reader head 102 and handle 104 to enable to user to operate the hand-held code reader 100. The reader head 102 may house optoelectronics (e.g., light emitting diodes (LEDs), image sensors, photodiodes, etc.) and other electronics (e.g., processor, LED drivers, LCD drivers, etc.) for reading and processing machine-readable indicia being read by the code reader 100. The reader head 102 may also include illumination elements (not shown), such as LEDs, configured to output a primary aiming pattern (not shown) and secondary aiming pattern 106 in the form of light beams.

A primary aiming pattern is a light pattern that is generally illuminated on a surface on which a machine-readable indicia is positioned to assist a user with aiming a code reader to read the machine-readable indicia. A secondary reading pattern, in this case formed of a first light beam 106a and second light beam 106b (collectively 106), may be generated and projected onto a surface on which the machine-readable indicia is positioned to assist the user with aiming the code reader 100 when the code reader 100 is placed close to (e.g., at a contact distance) the machine-readable indicia. As understood in the art, the code reader 100 is often placed at a contact distance relative to the machine-readable indicia when the machine-readable indicia is a DPM code, which allows the code reader 100 to shield the DPM code from ambient light or otherwise to improve reading accuracy, but covers the primary aiming pattern in the optical field-of-view of the code reader 100.

Figure 2:
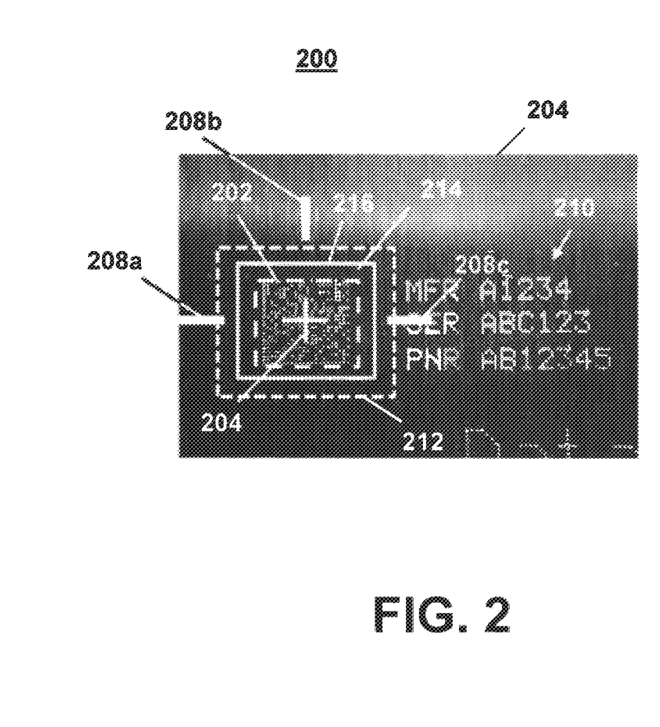
FIG. 2 is an illustration of an illustrative machine-readable indicia, in this case a direct part marking (DPM) code imprinted on a part, and showing a primary aiming pattern and a secondary aiming pattern.

With regard to FIG. 2, an illustration of an illustrative scene 200 in which a machine-readable indicia 202, in this case a direct part marking (DPM) code imprinted on an object 204, along with a primary aiming pattern 206 illuminated on the code 202 and a secondary aiming pattern 208a-208c (collectively 208) illuminated away from the code 202 is shown. The object 204 may also include alphanumeric text 210 marked thereon that includes information about the manufacturer, date of production, or otherwise, as understood in the art.

The code reader may have various mechanical and optical parameters. A perimeter line 212 is illustrative of a perimeter of a reader head of the code reader when aimed at, and especially at a contact distance from, the machine-readable indicia 202. In this case, the perimeter line 212 is shown to be directly in front of the machine-readable indicia 202. A field-of-view rectangle 214 indicates an optical field-of-view of reading optics of the code reader for reading the machine-readable indicia 202 when positioned at a reading distance from the machine-readable indicia 202. Depending on the type and size of the machine-readable indicia along with lighting, reading distances of the code reader may vary. The sizes of the field-of-view rectangle 214 may vary based on the distance of the code reader from the machine-readable indicia 202. For example, the farther the code reader is from the machine-readable indicia 202, the larger the sizes of the FOV rectangle 214. As shown, the FOV rectangle 214 is large enough to fully encircle the machine-readable indicia 202 when the code reader is placed at a contact distance of the machine-readable indicia 202. A marginal rectangle 216 is disposed marginally within the FOV rectangle 214 to define a margin region within which the code reader is capable of reading a machine-readable indicia 202.

Aiming patterns are helpful to users to improve aim and efficiency of use of code readers. The primary aiming pattern 212, in this case a pair of crossing lines in the shape of a plus sign (+), is produced by primary illumination elements of the code reader, and the secondary aiming pattern 208 extending radially outward from a center of the FOV rectangle 214. In an embodiment, and as further described herein, the secondary aiming pattern lines 208 may be turned OFF prior to the code reader being disposed within a proximity distance of the object 204, and turned ON when the code reader is positioned within the proximity distance of the object 204. The secondary aiming pattern lines 208 may be any size and shape, including straight lines, arrows, curves, circle, or otherwise to assist in a user and aiming the code reader when using the code reader to read the machine-readable indicia 202. It should be understood that the machine-readable indicia 202 may have a variety of different sizes and shapes, such that when the code reader is positioned at a contact distance from the object 204, the user may be unable to view the primary aiming pattern.

Figure 3A:
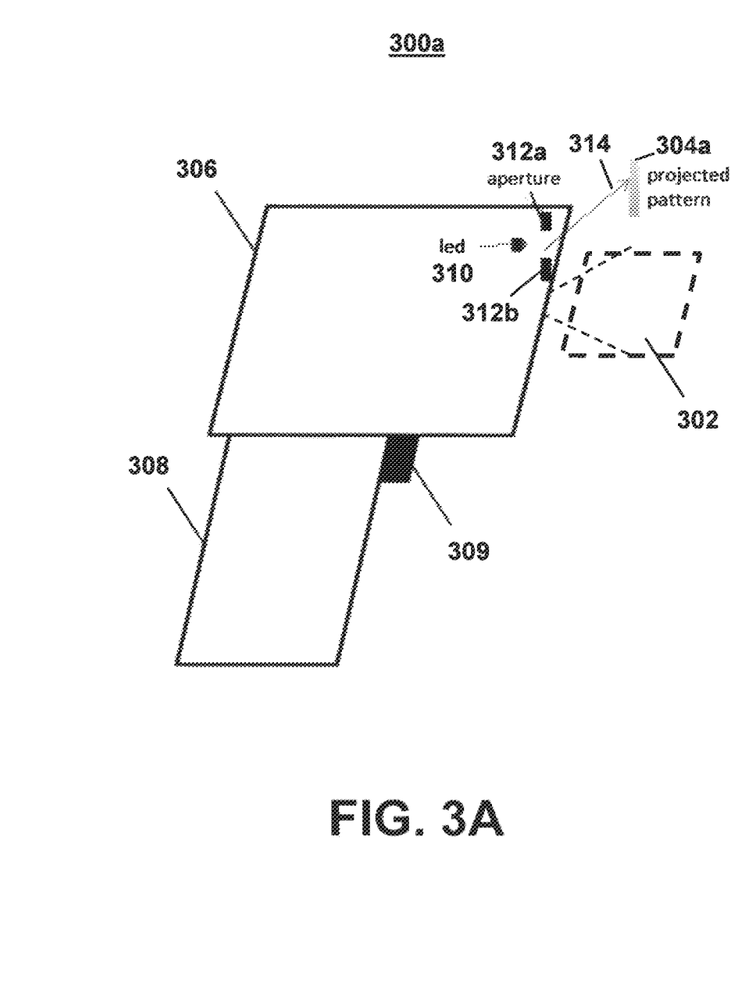
FIGS. 3A and 3B are illustrations of an illustrative hand-held code reader configured to read a machine-readable indicia within a field-of-view (FOV), and to display a secondary aiming pattern outside of the FOV.
Figure 3B:
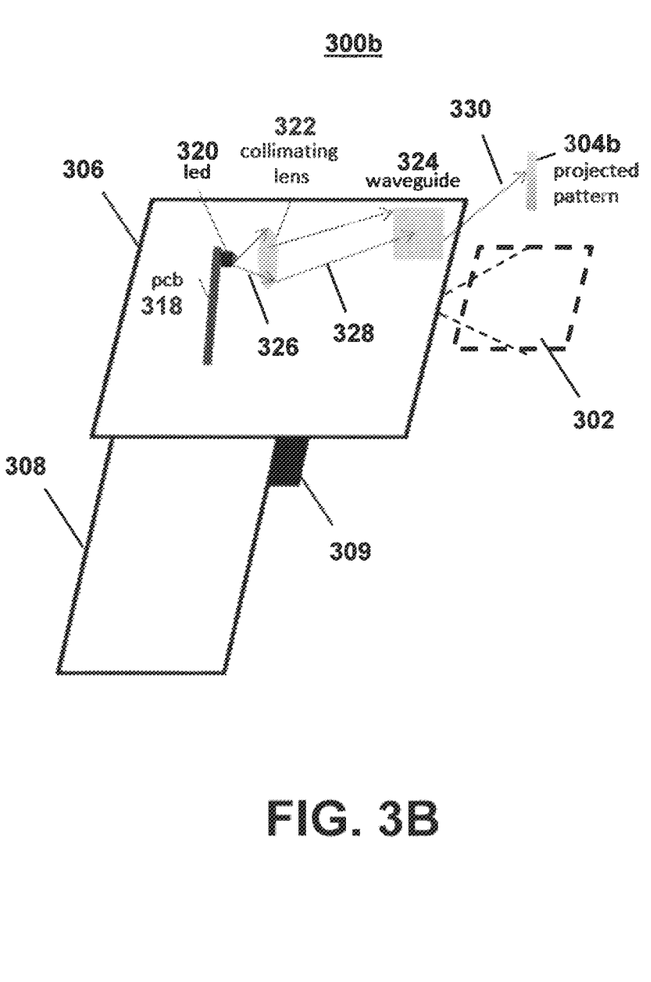

With regard to FIGS. 3A and 3B, illustrations of illustrative hand-held code readers 300a and 300b that are configured to read a machine-readable indicia (not shown) within an optical field-of-view (FOV) 302, and to display respective secondary aiming patterns 304a and 304b outside of the FOV 302 are shown. The code readers include reader heads 306 that house electronics, optics, and optoelectronics, and handles 308 for a user to hold the code readers 300a and 300b. In an embodiment, a trigger 309 may be provided to enable the user to initiate the code reader 300 to scan or read a machine-readable indicia.

The code reader 300a is shown to include a light source 310, which may be an LED or laser diode, that projects light through one or more apertures 312a and 312b to output a light beam 314 to form the projected secondary aiming pattern 304a. It should be understood that other secondary aiming patterns (not shown) may be projected on the surface via the aperture 312b. In this case, the aiming pattern 304a is a clear and visible pattern that may be shown on a surface when placed close to a nose or reader end of the code reader 300a. The light source 310 may be driven by electronics to cause the light source 310 to turn ON and turn OFF based on a proximity sensor (not shown). Alternatively, any other technique, such as position, button, trigger, or otherwise for turning ON and OFF the light source 310 may be utilized. In an embodiment, the light source 310 may be maintained ON and there is no lens in the apertures 312, such that the secondary aiming pattern 304a is not clearly visible much beyond the focal distance of the light source 310. In an embodiment, the focal distance may be a few centimeters (e.g., 4 cm). The LED may be formed of one or more LEDs, and be capable of outputting one or more different colors such that the light source 310 may be used in providing a notification to the user when the code reader properly reads and decodes a machine-readable indicia.

As shown in FIG. 3B, a printed circuit board (PCB) 318 that includes electronics (not shown) for operating the code reader 300b may include an light source 320, such as an LED or laser diode, disposed thereon. The light source 320 may include one or more LEDs, and be configured to output one or more different colors, as further described herein. Optical elements including a collimating lens 322, waveguide 324, and lens (not shown) positioned in an aperture, for example, may be included, as well. In an embodiment, the waveguide 324 may be rectangular, and may be disposed behind a scanning or reading window (not shown) of the code reader 300b. In operation, the light source 320 may be turned ON, and a light beam 326 may be directed to the collimating lens 322, which may produce a collimated light beam 328 via the waveguide 324 that, in turn, creates a light beam 330 that forms the aiming pattern 304b. In an embodiment, at a distance from the output of the code reader farther than a certain distance, such as 4 cm, which may be a contact reading distance, the aiming pattern 304b may be blurred, so not particularly visible to avoid interfering with a standard or primary aiming pattern. The aperture(s) may be rectangular or any other shape to cause the secondary aiming pattern to have a particular shape.

Figure 4A:
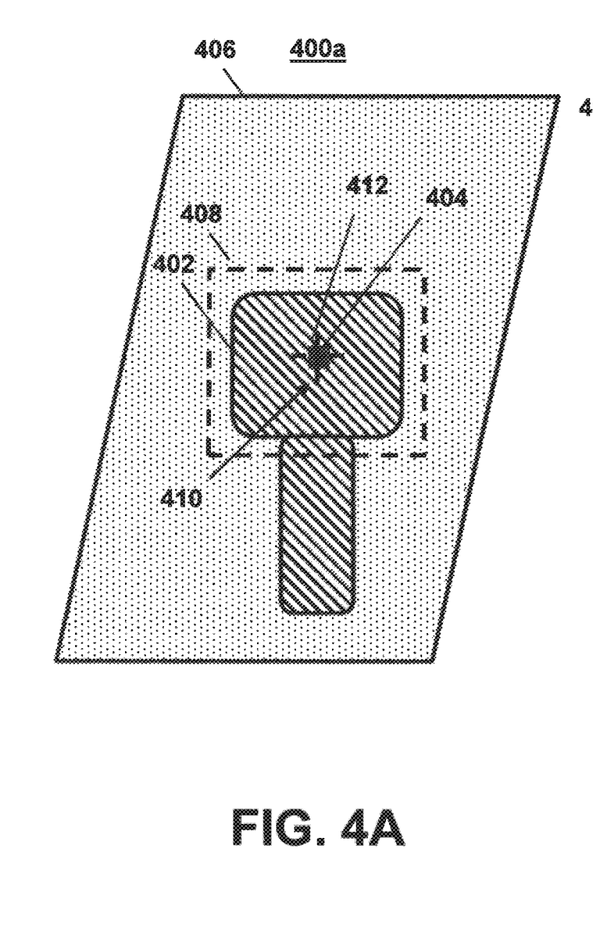
FIGS. 4A and 4B are illustrations of an illustrative hand-held code reader configured to read machine-readable codes, such as DPM codes marked on parts, and showing a perspective field-of-view of a user operating the code reader at a distance beyond a proximity distance P.
Figure 4B:
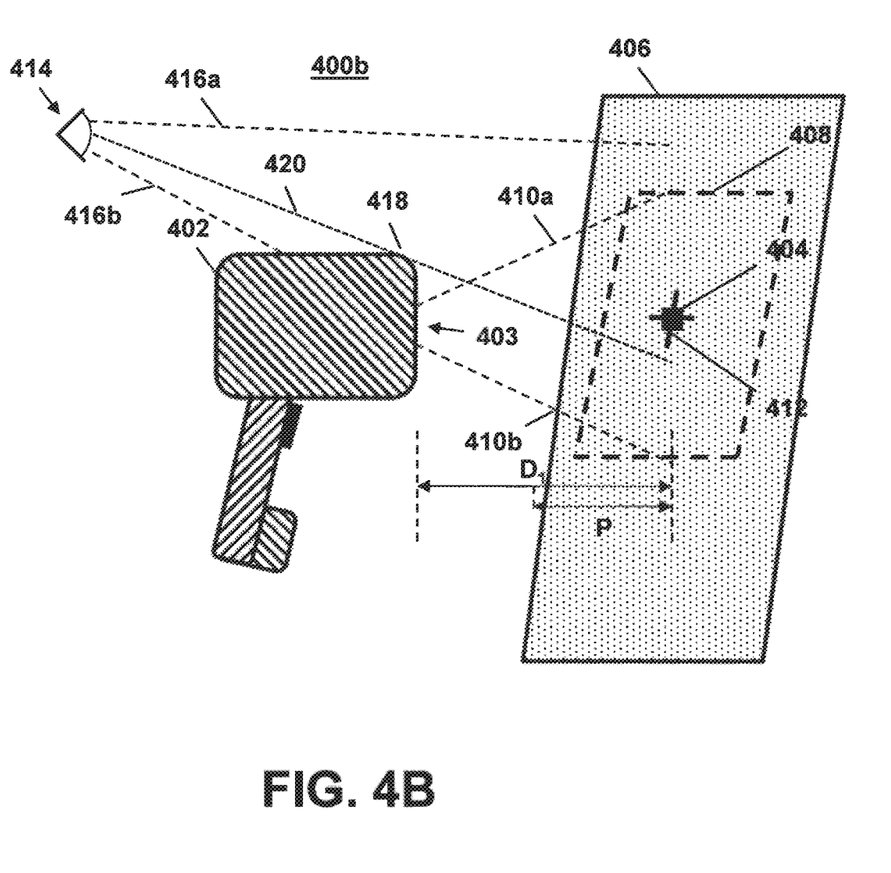

With regard to FIGS. 4A and 4B, illustrations of scenes 400a and 400b with an illustrative hand-held code reader 402 configured to read machine-readable codes, such as DPM codes, marked on objects, such as parts of machines are shown. The code reader 402 may be positioned to read a machine-readable indicia 404, such as a DPM code, disposed on an object 406. As shown in the rear view of the code reader 402 in FIG. 4A, the code reader 402 may have an optical field-of-view region 408 vertically delimited by view lines 410a and 410b of reading optics (not shown), and the code reader 402 may generate a primary aiming pattern 412, shown as a plus (+) symbol. It should be understood that alternative primary aiming pattern shapes may be utilized, as understood in the art. The primary aiming pattern 404 may be generated by an illumination source (e.g., LED) in the code reader 402, and output from a reading window 403 through which the code reader 402 reads the machine-readable indicia 404.

A perspective view of a user 414 using the code reader 402 may be formed between primary viewing lines 416a and 416b as he or she is looking toward the machine-readable indicia 404. The code reader 402 has a nose portion 418 behind which blocks the perspective field-of-view of the user 414, where the field-of-view of the user 414 may be limited to being between view lines 416a and 420. As shown, the distance of the code reader 402 relative to the object 406 is $D_1$. A proximity distance P may be defined by a proximity sensor (not shown) within the code reader 402. In an alternative embodiment, the proximity distance P may be determined through an analysis of an acquired image, so the sensor may also be the image sensor of the code reader 402. If the proximity sensor of the code reader 402 senses that the code reader 402 is outside of the proximity distance P, then a secondary aiming pattern is not illuminated onto the surface of the object 406, thereby saving power of the code reader 402.

Figure 5A:
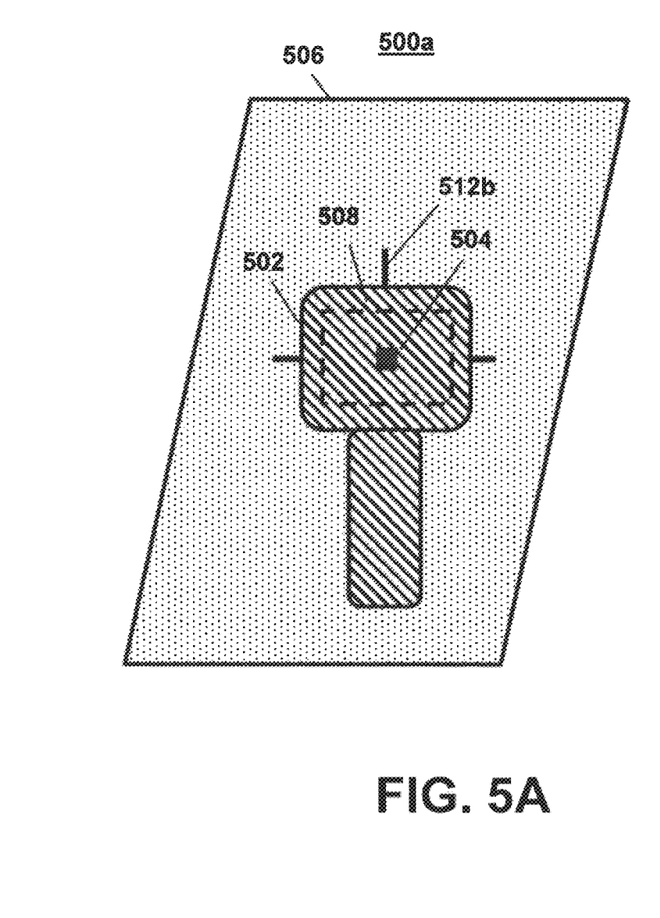
FIGS. 5A and 5B are illustrations of an illustrative hand-held code reader configured to read machine-readable codes, such as DPM codes marked on parts, and showing a perspective field-of-view of a user operating the code reader at a distance within a proximity distance P.
Figure 5B:
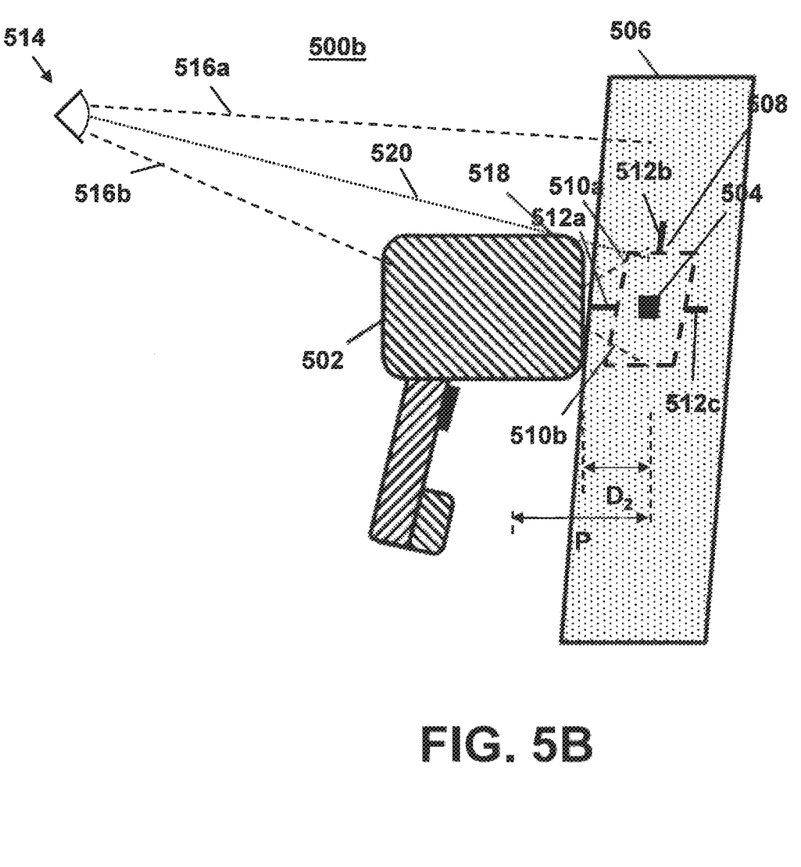

With regard to FIGS. 5A and 5B, illustrations of scenes 500a and 500b with an illustrative hand-held code reader 502 configured to read machine-readable codes, such as DPM codes marked on parts, are shown. The code reader 502 may be positioned at a contact distance 02 to read a machine-readable indicia 504 disposed on an object 506. The code reader 502 may have a field-of-view region 508 vertically limited by the view lines 510a and 510b of reading optics (not shown), and the code reader 502 may be configured to generate a primary aiming pattern (not shown due to being turned OFF due to being within a proximity distance P, as defined by a proximity sensor (not shown)). The field-of-view region 508 is shown to be much smaller than the field-of-view region 408 of FIG. 4A due to distance $D_2$ being much shorter than distance $D_1$. A secondary aiming pattern 512a-512c (collectively 512) is shown outside of the field-of-view region 508 and within a perspective field-of-view of a user 514 on the object 506.

The perspective field-of-view of a user 514 using the code reader 502 may be formed between primary viewing lines 516a and 516b as he or she is looking toward the machine-readable indicia 504. The code reader 502 has a nose portion 518 behind which blocks the perspective field-of-view of the user 514, where the perspective field-of-view of the user 514 may be limited to being between viewing lines 516a and 520. If the proximity sensor of the code reader 502 senses that the code reader 502 is within the proximity distance P, then the secondary aiming pattern 512 is illuminated onto the surface of the object 506. Alternative processes for illuminating and/or not illuminating the secondary aiming pattern 512 may be utilized.

Figure 6:
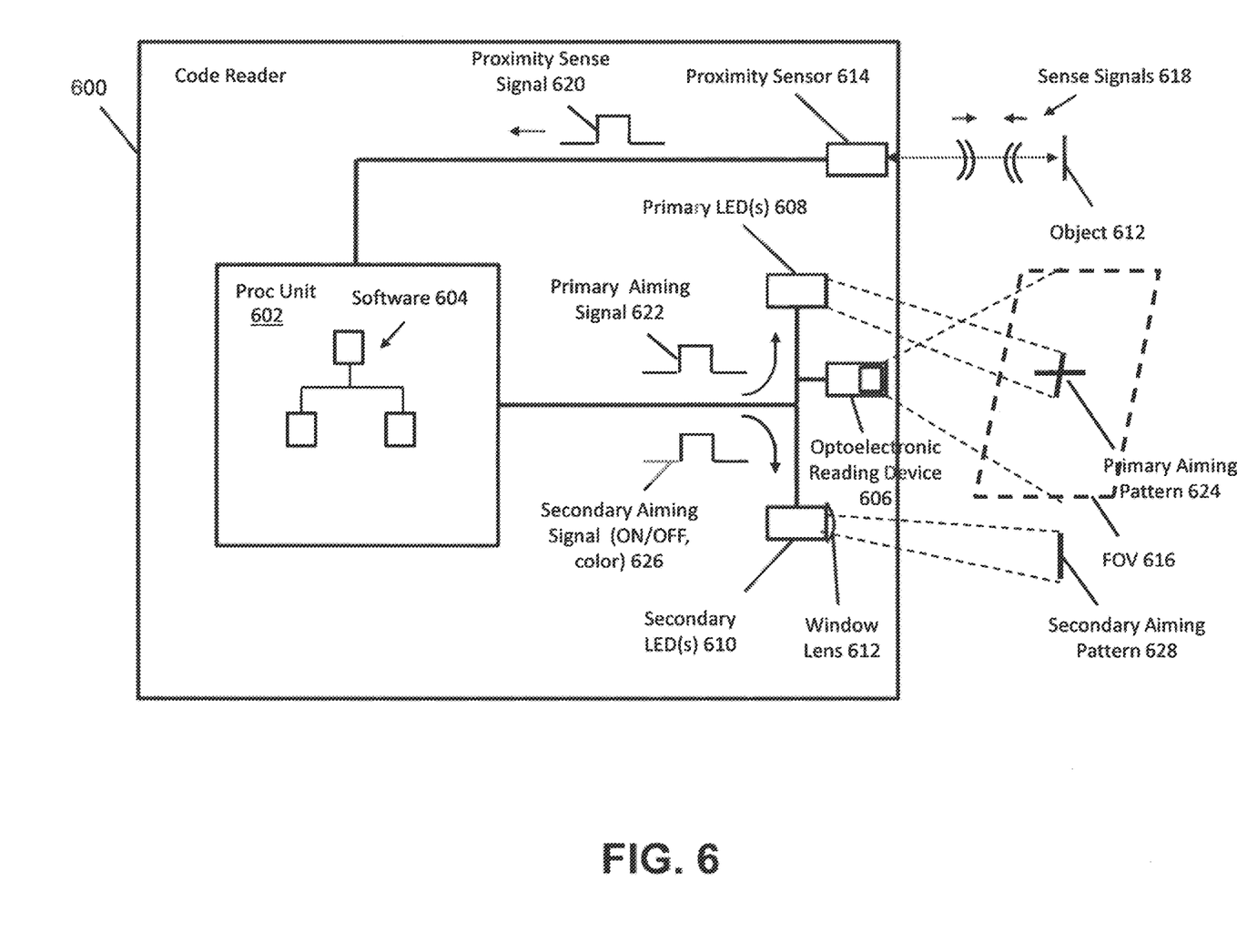
FIG. 6 is a schematic of illustrative electronics of a code reader inclusive of optoelectronics configured to read machine-readable indicia, and to display primary and secondary aiming patterns during a reading process.

With regard to FIG. 6, a schematic of illustrative electronics 600 of a code reader inclusive of optoelectronics configured to read machine-readable indicia, and to display primary and secondary aiming patterns during a reading process is shown. The electronics 600 may include a processing unit 602 that executes software 604. The processing unit 602 may include one or more processors configured to perform image and/or signal processing. In an embodiment, the processing unit 602 may include analog components that are used for processing analog signals, and the results may be communicated to a digital processor for further processing. The software 604 executed by the processing unit 602 may also be configured to operate as a controller for operating the code reader, such as responding to a trigger, turning on lights, operating an electronic display, communicating signals with other devices or a network, as so forth, as understood in the art.

An optoelectronics reading device 606 may be used to read machine-readable indicia, such as DPM codes. The optoelectronic reading device 606 may include any optoelectronic elements, as understood in the art. For example, image sensors, 1D optical sensor, or 2D optical sensor, such as those formed by photodiodes, may be utilized. Optical elements, such as lens(es), may be utilized, as well. A scanning window through which the optoelectronic reading device 606 views the machine-readable indicia, may be included. The electronics 600 may further include (i) primary LED(s) 608, (ii) secondary LED(s) 610 that illuminate through a window lens 612, and (iii) proximity sensor 614 that are in communication with the processing unit 602.

In operation, the optoelectronic reading device may have a field-of-view 616 used to scan and/or capture images to read machine-readable indicia. The proximity sensor 614 may be an active or passive sensor, and be configured to send and/or receive sense signals 618 to sense objects within a proximate range of the code reader. A proximity sense signal 620 may be communicated from the proximity sensor 614 to the processing unit 602 for processing thereby. The processing unit 602 may receive and process the proximity sense signal 620. In an embodiment, the proximity sense signal 620 may be LOW when no object is sensed, and HIGH when an object is sensed. In an embodiment, when no object is sensed by the proximity sensor 614, the proximity sense signal 620 may be LOW (i.e., logical 0), and the processing unit 602 may cause a primary aiming signal 622 to be HIGH (i.e., logical 1) to cause the primary LED(s) to turn ON to produce a primary aiming pattern 624, such as a cross or plus (+) sign.

In response to the proximity sensor 614 sensing an object with a proximity distance, the proximity sense signal 620 may be HIGH, and the processing unit 602 may turn OFF the primary aiming signal 622 to cause the primary LED(s) 608 to turn OFF and stop illuminating the primary aiming pattern 624, and cause a secondary aiming signal 626 to be HIGH to cause the secondary LED(s) to turn ON, thereby producing a secondary aiming pattern 628 to assist the user with aiming the code reader for reading a machine-readable indicia when the code reader is near (e.g., contact distance) the object on which the machine-readable indicia is positioned. The window lens 612 may have a focal distance, where the secondary aiming pattern 628 is in focus when at a distance that is optimal for the code reader to read machine-readable indicia, thereby further assisting the user with operating the code reader. The processing unit 602 may also be able to generate the secondary aiming signal 626 or another signal to cause the secondary LED(s) 610 to change color in response to a machine-readable indicia being decoded or otherwise determined (e.g., alphanumeric text being translated by using optical character recognition (OCR)).

Figure 7:
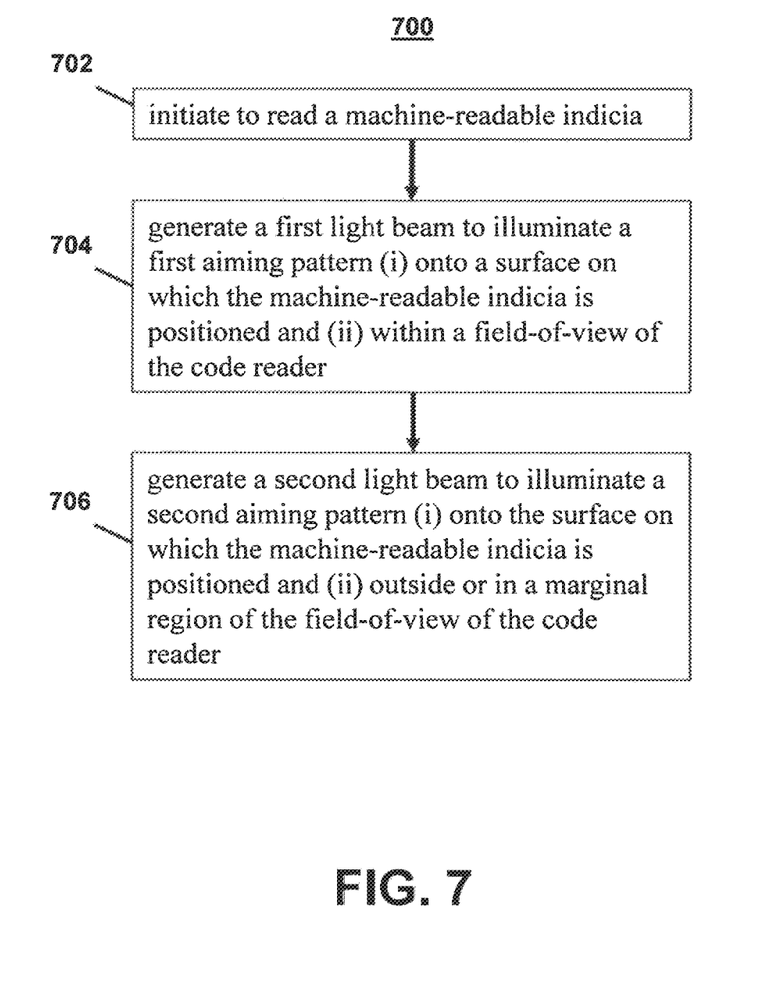
FIG. 7 is a flow diagram of an illustrative process for reading a machine-readable indicia in generating first and second aiming patterns during the reading process.

With regard to FIG. 7, a flow diagram of an illustrative process 700 for reading a machine-readable indicia in generating first and second aiming patterns during the reading process is shown. The process 700 may start at step 702, where reading a machine-readable indicia may be initiated. The initiation may be manual (e.g., via a trigger) or automatic (e.g., optoelectronics automatically turned on in response to movement of the code reader). At step 704, a first light beam may be generated to illuminate a first aiming pattern (i) onto a surface on which the machine-readable indicia is positioned, and (ii) within a field-of-view of the code reader.

At step 706, a second light beam may be generated to illuminate a second aiming pattern (i) onto the surface on which the machine-readable indicia is positioned and (ii) outside or in a marginal region of the field-of-view of the code reader. The first light beam may be turned OFF in response to a proximity sensor detecting an object, and the second light beam may be turned ON in response to the code reader being within a proximity distance. In an embodiment, in response to the machine-readable indicia being decoded by a processing unit, a signal may cause a color of the second light beam to change color (e.g., red to green).

The process may further include sensing distance from the surface on which the machine-readable indicia is positioned and from where the optoelectronic reading device is reading. In response to receiving a proximity signal indicative of the reader being within a certain distance of the surface, the second light beam may be transitioned from an OFF state to an ON state.

The process may further include decoding the machine-readable indicia, and, in response to decoding the machine-readable indicia, the second light beam may be transitioned from a first color to a second color so as to visually notify a user that the machine-readable indicia has been decoded. The machine-readable indicia may be read via a scanning window. Illumination of the first light beam may be directed via the scanning window to illuminate the first aiming pattern on the surface, and illumination of the second light beam may be directed via at least one secondary aiming light window to illuminate the second aiming pattern on the surface on which the machine-readable indicia is positioned. In an embodiment, the second light beam may be focused by the secondary aiming light window(s) with a focal length that corresponds with an optimal reading distance of the code reader.

Figure 8:
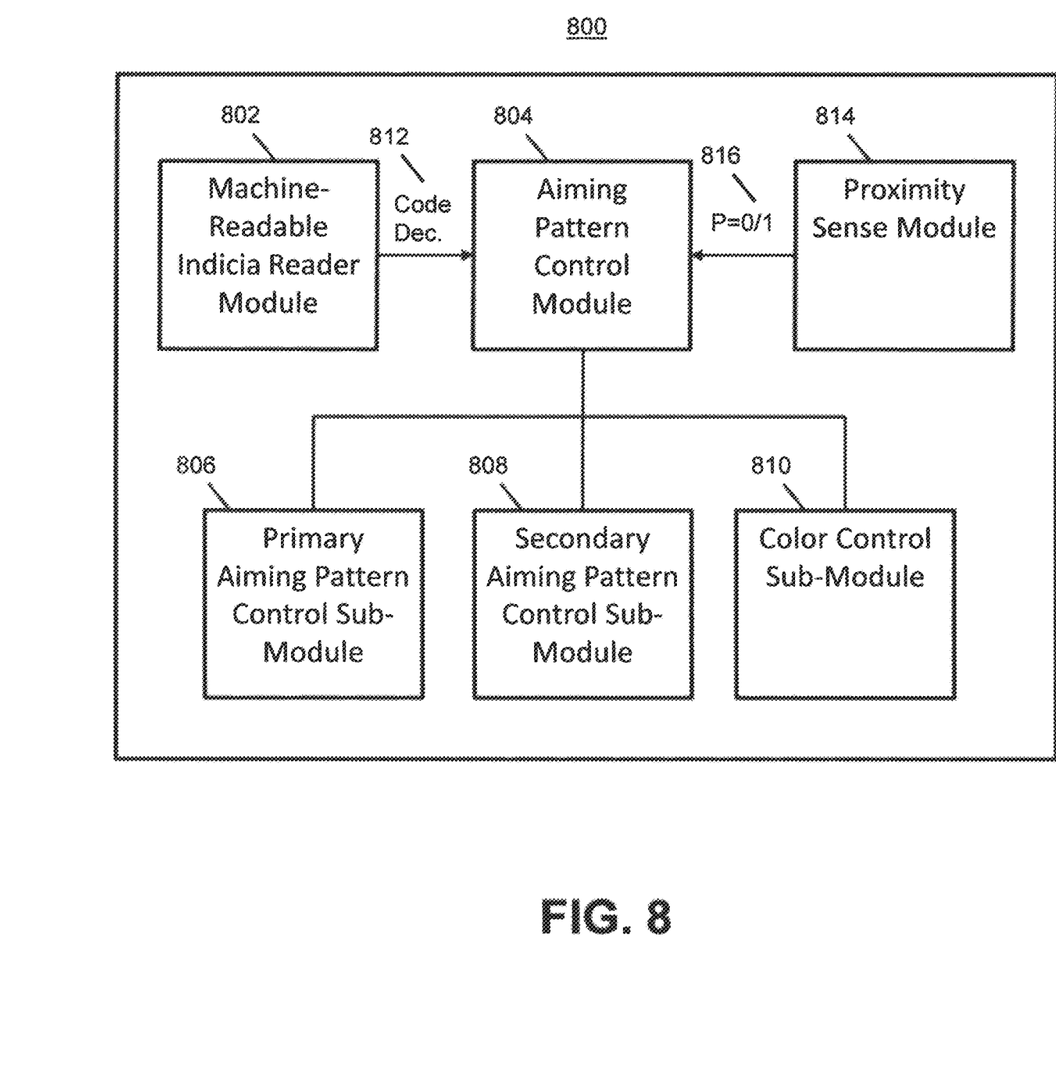
FIG. 8 is a block diagram of illustrative software modules configured to control a code reader to display primary and secondary aiming patterns when reading machine-readable indicia.

With regard to FIG. 8, a block diagram of illustrative software modules 800 configured to control a code reader to display primary and secondary aiming patterns when reading machine-readable indicia is shown. The software modules 800 may include a machine-readable indicia reader module 802 that is configured to read machine-readable indicia. The machine-readable indicia may include a wide variety of indicia, such as a barcode, QR code, alphanumeric characters, or otherwise. An aiming pattern control module 804 may be a module that is used to control primary and secondary aiming patterns by controlling illumination devices, such as LEDs. The aiming patterns may be shaped in any number of ways, as previously described. The module 804 may include one or more submodules, including a primary aiming pattern control sub-module 806, secondary aiming pattern control sub-module 808, and color control sub-module 810. The sub-module 806 may be configured to control primary illumination element(s) that may be used to turn ON and OFF a primary aiming pattern. Similarly, the sub-module 808 may be configured to control secondary illumination element(s) that may be used to turn ON and OFF a secondary aiming pattern. The sub-module 810 may be configured to change color of the secondary illumination element(s) in response to the module 802 successfully decoding and communicating a code decoded message or parameter 812 to the module 804, which may cause the sub-module 810 to change color being illuminated by the secondary illumination element(s). In the event that an error occurs when decoding a machine-readable indicia, then the sub-module 808 may cause an alternative action may occur, such as turning the secondary aiming pattern a different color, flashing the secondary aiming pattern, or both.

A proximity sense module 814 may be configured to determine that a proximity sensor senses an object. In an alternative embodiment, the distance of the surface may also be detected through the analysis of an acquired image, so the proximity sensor could also include the image sensor and processor. A variable P may be set to LOW if no object is sensed or HIGH if an object is sensed. The variable P may remain HIGH while the object is being sensed by the proximity sensor and transitioned back to LOW upon not sensing the object.

Figure 9:
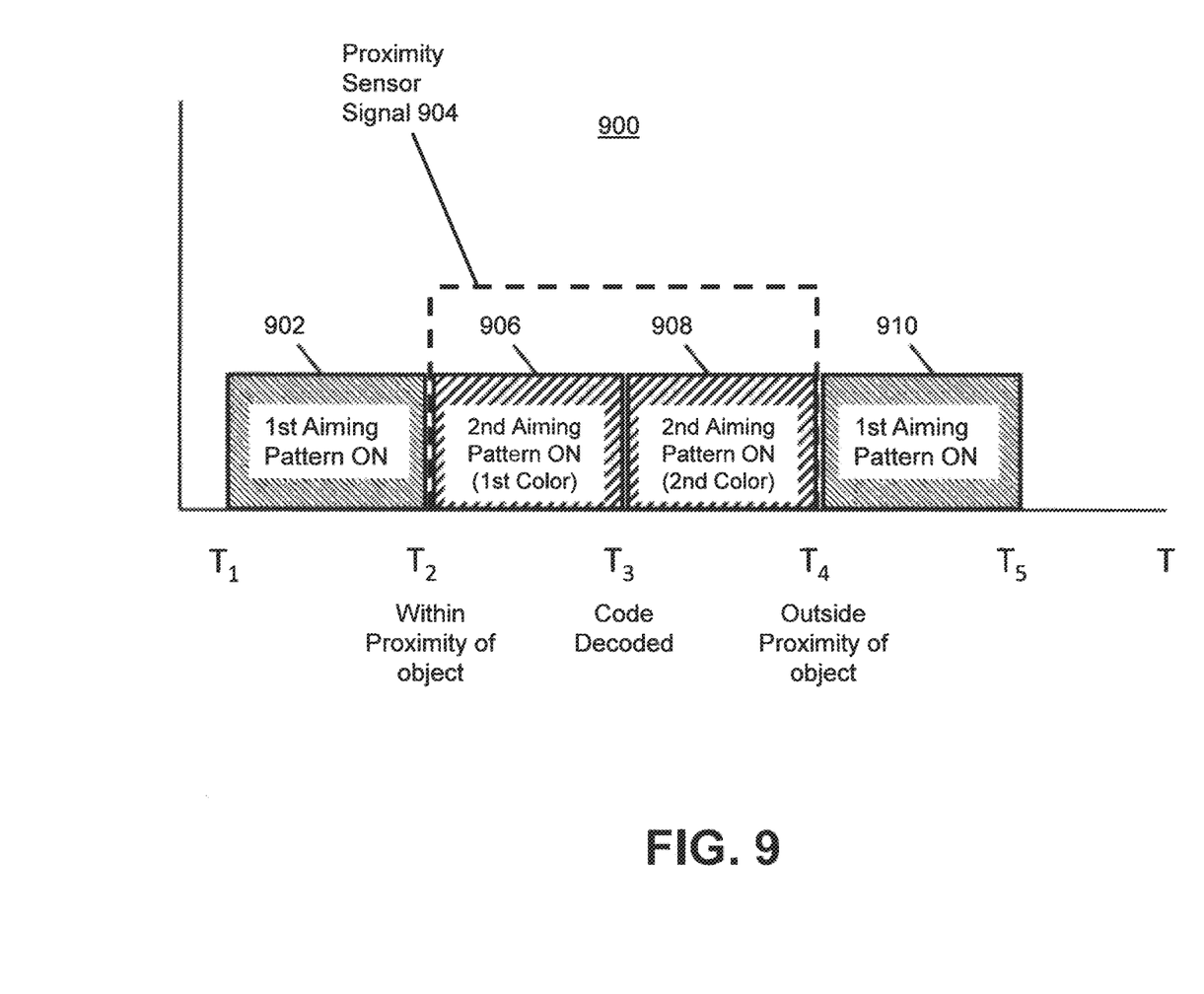
FIG. 9 is a timing diagram showing timing of a code reader showing first and second aiming patterns based on proximity of the code reader relative to an object on which machine-readable indicia is positioned.

With regard to FIG. 9, a timing diagram 900 showing timing of a code reader showing first and second aiming patterns based on proximity of the code reader relative to an object on which machine-readable indicia is positioned is shown. The timing diagram 900 shows an illustrative five points in time $T_1$-$T_5$, at which different events occur. At time $T_1$, the code reader may initiate a process to begin reading machine-readable indicia. In response, a first or primary aiming pattern may be turned ON during time period 902. At time $T_2$, a proximity sensor may sense an object, which causes a proximity sensor signal 904 may transition from LOW to HIGH during time period 906. In response, a second or secondary aiming pattern may be turned ON. The aiming pattern may have a first color. At time $T_3$, a code may be decoded, and in response, the secondary aiming pattern may remain ON, but may be changed from a first to a second color to indicate to the user that the code of the machine-readable indicia has been successfully or unsuccessfully decoded during time period 908. At step $T_4$, the code reader may be moved outside of being within proximity of the object, which causes the primary aiming pattern to be turned ON again during time period 910.

Figure 10A:
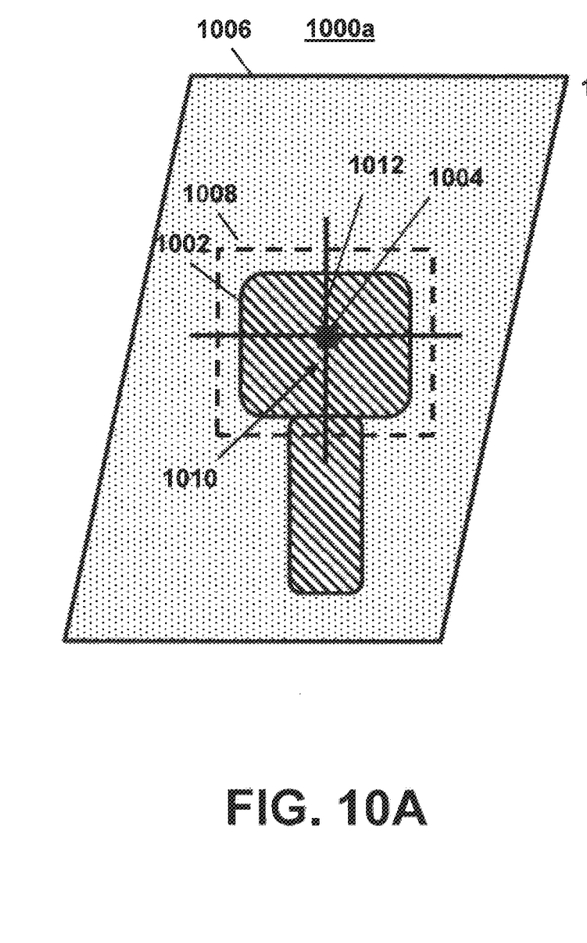
FIGS. 10A and 10B are illustrations of an illustrative hand-held code reader configured to read machine-readable codes with an aiming pattern that extends out of the lateral border of a scanning window in case of contact reading or proximity reading, as shown in FIGS. 11A and 11B.
Figure 10B:
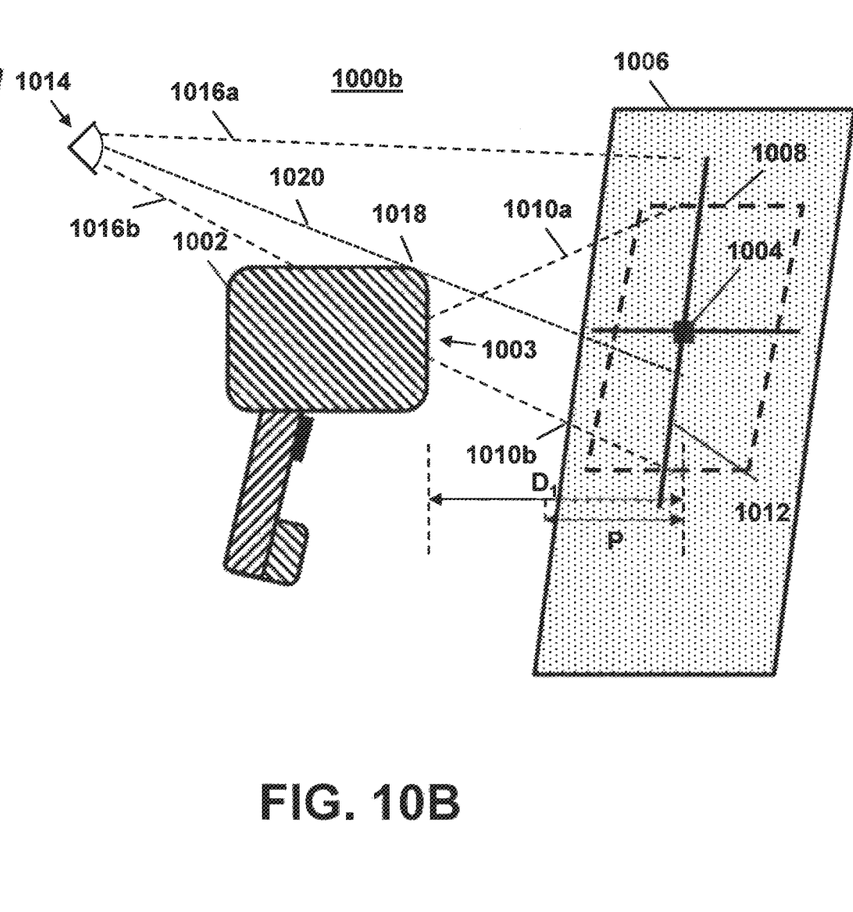
Figure 11A:
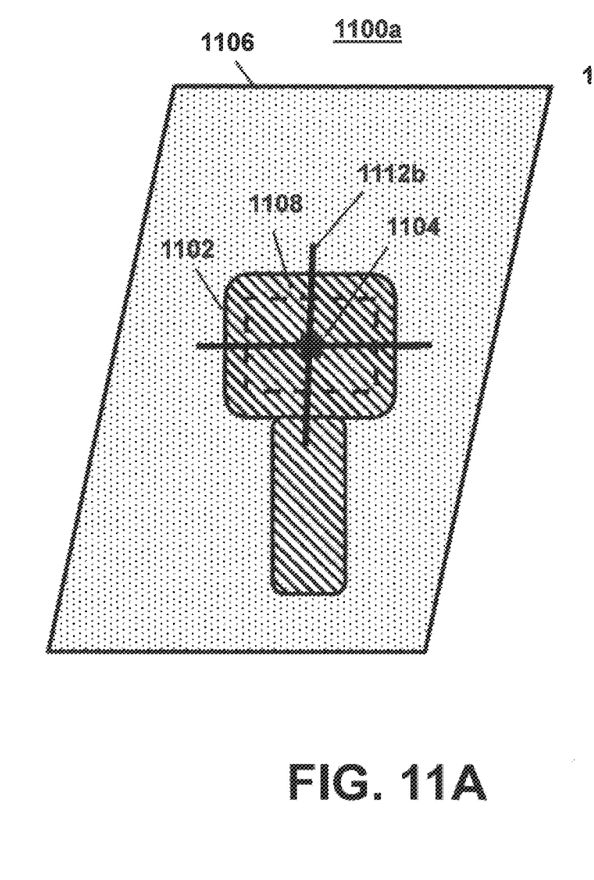
FIGS. 11A and 11B are illustrations of an illustrative hand-held code reader configured to read machine-readable codes with the aiming pattern of FIGS. 10A and 10B that extends out of the lateral border of a scanning window in the case of contact reading or proximity reading, as shown.
Figure 11B:
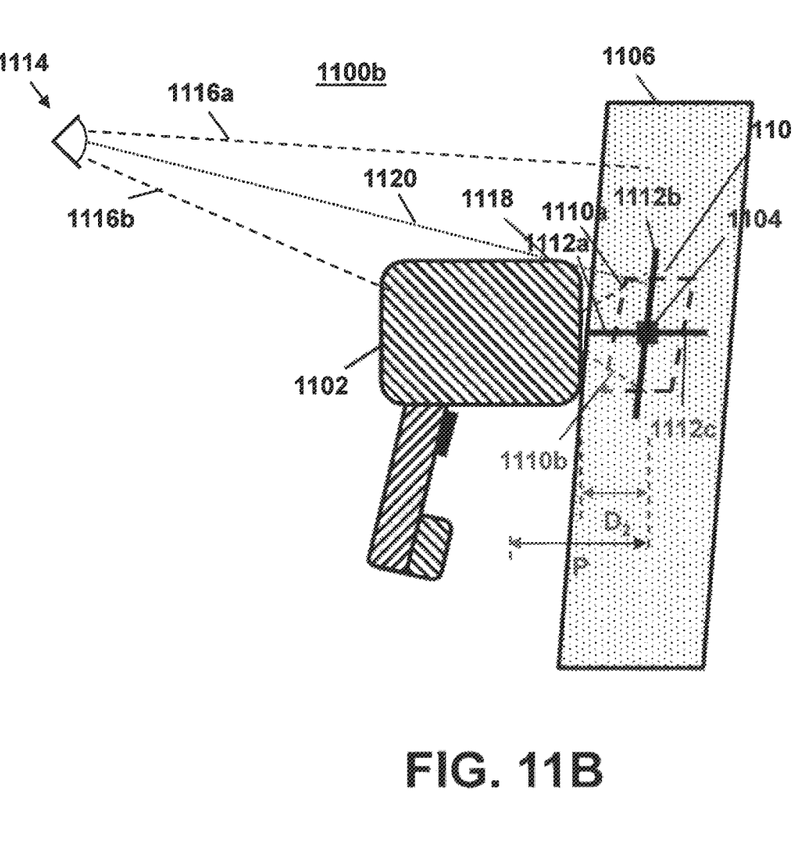

With regard to FIGS. 10A and 10B, FIGS. 10A and 10B are illustrations of an illustrative hand-held code reader configured to read machine-readable codes with, an aiming pattern that extends out of the lateral border of a scanning window in case of contact reading or proximity reading, as shown in FIGS. 11A and 11B. The code reader 1002 may be positioned to read a machine-readable indicia 1004 disposed on an object 1006. As shown in the rear view of the code reader 1002 in FIG. 10A, the code reader 1002 may have an optical field-of-view region 1008 vertically delimited by view lines 1010a and 1010b of reading optics (not shown), and the code reader 1002 may generate an aiming pattern 1012, shown as a plus (+) symbol. In this case, the aiming pattern 1012 is shown to be larger than the aiming patterns of other embodiments, such as shown in FIGS. 4A and 4B. It should be understood that alternative aiming pattern shapes may be utilized. The aiming pattern 1012 may be generated by an illumination source in the code reader 1002, and output from a reading window 1003 through which the code reader 1002 reads the machine-readable indicia 1004.

A perspective view of a user 1014 using the code reader 1002 may be formed between primary viewing lines 1016a and 1016b as he or she is looking toward the machine-readable indicia 1004. The code reader 1002 has a nose portion 1018 behind which blocks the perspective field-of-view of the user 1014, where the field-of-view of the user 1014 may be limited to being between view lines 1016a and 1020. As shown, the distance of the code reader 1002 relative to the object 1006 is $D_1$. A proximity distance P may be defined by a proximity sensor within the code reader 1002. In an alternative embodiment, the proximity distance P may be determined through an analysis of an acquired image, as previously described. In this embodiment, and as shown in FIGS. 11A and 11B, the aiming pattern 1004 operates as a both a primary and secondary aiming pattern, as previously described with regard to FIGS. 4A and 5A.

With regard to FIGS. 11A and 11B, illustrations of an illustrative hand-held code reader 1100a and 1100b configured to read machine-readable codes with the primary aiming pattern of FIGS. 10A and 10B as guides that extend out of the lateral border of a scanning window in the case of contact reading or proximity reading are shown. The code reader 1102 may be positioned at a contact distance $D_2$ to read a machine-readable indicia 1104 disposed on an object 1106. The code reader 1102 may have a field-of-view region 1108 vertically limited by the view lines 1110a and 1110b of reading optics (not shown), and the code reader 1102 may be configured to generate an aiming pattern 1112. The field-of-view region 1108 is shown to be much smaller than the field-of-view region 1108 of FIG. 10A due to distance $D_2$ being much shorter than distance $D_1$. In this case, rather than a secondary aiming pattern being generated, the aiming pattern 1112 is shown to extend outside of the field-of-view region 1108 and within a perspective field-of-view of a user 1114 on the object 1106.

The perspective field-of-view of a user 1114 using the code reader 1102 may be formed between primary viewing lines 1116a and 1116b as he or she is looking toward the machine-readable indicia 1104. The code reader 1102 has a nose portion 1118 behind which blocks the perspective field-of-view of the user 1114, where the field-of-view of the user 1114 may be limited to being between viewing lines 1116a and 1120. If the proximity sensor of the code reader 1102 senses that the code reader 1102 is within the proximity distance P, then the aiming pattern 1112 may remain on to illuminate the surface of the object 1106 so as to be within the perspective field-of-view of the user 1114. In an embodiment, optics (not shown) that generate the aiming pattern 1112 be fixed (although the aiming pattern 1112 may appear to become shorter and longer as the distance of the code reader 1102 respectively moves closer and farther from the object 1106). Alternatively, the optics be variable such that the aiming pattern 1112 is small and centrally positioned (see FIG. 4A) when beyond the proximity distance P, and dynamically increase length of the aiming pattern 1112 in response to the proximity distance P being crossed. Alternative configurations may be used to ensure that the aiming pattern 1112 that exits the scanning window of the code reader 1102 is able to be seen by the user when contact scanning a machine readable indicia 1104.

Although the code readers shown are have handles for a user to hold, it should be understood that the principles described herein may additionally or alternatively be implemented on a mobile computer for reading. The mobile computer may be a mobile phone, be in the shape of a mobile phone, or have any other shape that does not utilize a handle. In an embodiment, one or more features may be included in a housing or protector case for a mobile device, and be in electrical communication with a processor of the mobile device. In an alternative embodiment, the principles described herein may be within a presentation scanner that is configured to stand on a counter or be held by a stand. In an embodiment, an adapter that includes one or more features described herein may be physically and/or electrically connected to an existing presentation scanner.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A code reader, comprising:
   an optoelectronic reading device configured to read a machine-readable indicia;
   a primary aiming illuminator configured to generate a first light beam to illuminate a first aiming pattern (i) onto a surface on which the machine-readable indicia is positioned and (ii) within a field-of-view of the optoelectronic reading device;
   a secondary aiming illuminator configured to generate a second light beam to illuminate a second aiming pattern (i) onto the surface on which the machine-readable indicia is positioned and (ii) outside or in a marginal region of the field-of-view of the optoelectronic reading device;
   a proximity sensor configured to determine a distance from the surface on which the machine-readable indicia is positioned and from where the optoelectronic reading device is reading; and
   electronics in electrical communication with the primary aiming, illuminator and the secondary aiming illuminator, and configured to independently control the primary aiming illuminator and the secondary aiming illuminator such that the secondary aiming illuminator is switched from OFF state to an ON state in response to receiving a proximity signal generated by the proximity sensor indicative of the code reader being within a predetermined distance of the surface.

2. The code reader according to claim 1, wherein the secondary aiming illuminator is configured to generate at least two colors, and wherein the electronics of the optoelectronic reading device is further configured to:
   decode the machine-readable indicia read by the optoelectronic reading device; and
   in response to decoding the machine-readable indicia, cause the second light beam to transition from a first color to a second color to visually notify a user that the machine-readable indicia has been decoded.

3. The code reader according to claim 1, further comprising a housing that defines:
   (i) a scanning window via which the optoelectronic reading device and the primary aiming illuminator are configured to, respectively perform reading and direct illumination of the first light beam; and
   (ii) at least one secondary aiming light window through which the second light beam is output to be illuminated onto the surface on which the machine-readable indicia is positioned.

4. The code reader according to claim 3, further comprising a lens disposed within each of the at least one secondary aiming light windows, and having a focal length that corresponds with an optimal reading distance of the optoelectronic reading device.

5. The code reader according to claim 1, wherein the proximity sensor is an active sensor.

6. The code reader according to claim 1, wherein the proximity sensor is a passive sensor.

7. The code reader according to claim 1, wherein the second aiming pattern is visible to the user when the code reader is at close distances within the predetermined distance and not visible to the user when the code reader is at far distances outside of the predetermined distance.

8. The code reader according to claim 1, wherein the proximity sensor is an image sensor of the optoelectronic reading device that is configured to determine the distance based on an analysis of an acquired image.

9. A method of reading a machine-readable indicia by a code reader, the method comprising:
initiating to read a machine-readable indicia;
determining a distance from a surface on which the machine-readable indicia is positioned and from where the optoelectronic reading device is reading; and
independently controlling a primary aiming illuminator and a secondary aiming illuminator including:
generating a first light beam by the primary aiming illuminator to illuminate a first aiming pattern (i) onto a surface on which the machine-readable indicia is positioned and (ii) within a field-of-view of the code reader; and
generating a second light beam by the secondary aiming illuminator to illuminate a second aiming pattern (i) onto the surface on which the machine-readable indicia is positioned and (ii) outside or in a marginal region of the field-of-view of the code reader in response to receiving a proximity signal indicative of the code reader being within a predetermined distance of the surface.

10. The method according to claim 9, further comprising:
decoding the machine-readable indicia; and
in response to decoding the machine-readable indicia, transitioning the second light beam from a first color to a second color so at) to visually notify a user that the machine-readable indicia has been decoded.

11. The method according to claim 9, further comprising:
reading the machine-readable indicia via a scanning window;
directing illumination of the first light beam via the scanning window to illuminate the first aiming pattern on the surface, and
directing illumination of the second light beam via at least one secondary aiming light window to illuminate the second aiming pattern on the surface on which the machine-readable indicia is positioned.

12. The method according to claim 11, further comprising focusing the second light beam by the at least one secondary aiming light window with a focal length that corresponds with an optimal reading distance of the code reader.

13. A code reader, comprising:
a housing configured to house optoelectronics to read machine-readable indicia, the optoelectronics having an optical field-of-view and the housing defining a perspective field-of-view of a user of the code reader when in operation, the perspective field-of-view blocking the entire optical field-of-view when in use;
a primary aiming illuminator;
at least one secondary aiming illuminator supported by the housing, and configured to generate a light beam that projects at least partially outside of the optical and perspective fields-of-view such that a user operating the code reader can view the light beam when in use;
a proximity sensor directed along a direction of the optical field-of-view, and wherein the proximity sensor is configured to generate a proximity signal in response to sensing that the code reader is within a predetermined distance from a surface on which the machine-readable indicia is positioned; and
electronics in electrical communication with the primary aiming illuminator and the secondary aiming illuminator, and configured to independently control the primary aiming illuminator and the secondary aiming illuminator such that the secondary aiming illuminator is switched from an OFF state to an ON state in response to receiving a proximity signal generated by the proximity sensor indicative of the code reader being within a predetermined distance of the surface.

14. The code reader according to claim 13, wherein the housing defines at least one aiming light window that enables the light beam of the at least one secondary aiming illuminator to exit therefrom.

15. The code reader according to claim 14, wherein the at least one aiming light window causes illumination from the at least one secondary aiming illuminator to produce a linear line on a surface on which the machine-readable indicia is disposed.

16. The code reader according to claim 14, wherein the at least one aiming light window includes a lens that defines a focal length such that an illumination beam generated by the at least one secondary illuminator is in focus on a surface on which the machine-readable indicia is disposed, thereby enabling a user to visually see a distance at which the machine-readable indicia is to be read.

17. The code reader according to claim 14, wherein the at least one aiming light window is disposed outside of a scanning window via which the optoelectronics view the machine-readable indicia.

18. The code reader according to claim 13, wherein the at least one secondary aiming illuminator is configured to illuminate in any of multiple colors, and further comprising electronics configured to:
decode the machine-readable indicia;
illuminate the at least one secondary aiming illuminator in a first color; and
in response to decoding the machine-readable indicia, transitioning the illumination of the at least one secondary aiming illuminator from the first color to a second color.

19. A code reader, comprising:
a housing configured to house optoelectronics to read machine-readable indicia, the optoelectronics having an optical field-of-view and the housing defining a perspective field-of-view of a user of the code reader when in operation, the perspective field-of-view blocking the entire optical field-of-view when in use;
a primary aiming illuminator configured to illuminate a primary aiming pattern that extends inside of the optical field-of-view;
a secondary aiming illuminator configured to illuminate a secondary aiming pattern that extends outside of the optical field-of-view and into the perspective field-of-view such that a user operating the code reader at a contact distance can view the secondary aiming pattern;
a proximity sensor configured to generate a proximity signal in response to sensing that the code reader is within a predetermined distance from a surface on which the machine-readable indicia is positioned, and electronics configured to independently control the primary aiming illuminator and the secondary aiming illuminator such that the secondary aiming illuminator is switched from being disabled to enabled in response to receiving a proximity signal generated by the proximity sensor indicative of the code reader being within a predetermined distance of the surface.

* * * * *